US008539108B2

(12) United States Patent
Liu et al.

(10) Patent No.: US 8,539,108 B2
(45) Date of Patent: *Sep. 17, 2013

(54) DISTRIBUTED ROBUST CLOCK SYNCHRONIZATION

(75) Inventors: Shao Liu, Bellevue, WA (US); Avi Bar-Zeev, Redmond, WA (US); Alex Aben-Athar Kipman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,852

(22) Filed: Sep. 14, 2012

(65) Prior Publication Data

US 2013/0013811 A1   Jan. 10, 2013

Related U.S. Application Data

(63) Continuation of application No. 12/971,903, filed on Dec. 17, 2010, now Pat. No. 8,316,155.

(51) Int. Cl.
*G06F 15/16* (2006.01)
(52) U.S. Cl.
USPC .......................................... 709/248; 709/224
(58) Field of Classification Search
USPC .......................................... 709/248, 223–224
See application file for complete search history.

(56) References Cited

U.S. PATENT DOCUMENTS

| 5,907,685 | A  | 5/1999  | Douceur      |
|-----------|----|---------|--------------|
| 7,047,435 | B2 | 5/2006  | Liou et al.  |
| 7,349,512 | B2 | 3/2008  | Rausch et al.|
| 2004/0072582 | A1 | 4/2004  | Aljadeff et al. |
| 2007/0038999 | A1 | 2/2007  | Millington   |
| 2008/0259966 | A1 | 10/2008 | Baird et al. |
| 2009/0319819 | A1 | 12/2009 | Haba         |
| 2010/0118895 | A1 | 5/2010  | Radulescu    |
| 2011/0035511 | A1 | 2/2011  | Biederman    |
| 2011/0276648 | A1 | 11/2011 | Soldan       |
| 2012/0075439 | A1 | 3/2012  | Gong et al.  |
| 2012/0159001 | A1 | 6/2012  | Liu et al.   |

OTHER PUBLICATIONS

Notice of Allowance mailed Jul. 12, 2012, in U.S. Appl. No. 12/971,903, filed Dec. 17, 2010.

Carli, et al. "Distributed synchronization of noisy non-identical double integrators." IEEE Transactions on Automatic Control Jul. 2010.

Clement, Eric and Michel Dagenais. "Traces Synchronization in Distributed Networks." Journal of Computer Systems, Networks, and Communications. Jun. 9, 2009, 11 pages. Hindawi Publishing Corporation: New York, NY, USA.

(Continued)

*Primary Examiner* — Philip B Tran
(74) *Attorney, Agent, or Firm* — Vierra Magen Marcus LLP

(57) ABSTRACT

Technology is provided for synchronization of clock information between networked devices. One or more of the devices may include one or more applications needed access to data and a common time reference between devices. In one embodiment, the devices have applications utilizing data shared in a network environment with other devices, as well as having a reference to a local clock signal on each device. A device may have a layer of code between the operating system and software applications that processes the data and maintains a remote clock reference for one or more of the other devices on the network.

20 Claims, 11 Drawing Sheets

(56) References Cited

OTHER PUBLICATIONS

"Introduction to Distributed Clock Synchronization and the IEEE 1588 Precision Time Protocol." Tutorial, National Instruments Developer Zone [online]. May 14, 2008, retrieved from the Internet on Aug. 25, 2010, 5 pages, URL: <http://zone.ni.com/devzone/cda/tut/p/id/2822>.

Krzyzanowski, Paul. "Lectures on distributed systems: Clock Synchronization." Lecture notes, Rutgers University Computer Science 416: Operating Systems (2010). Retrieved from the Internet on Aug. 25, 2010, 14 pages, URL: <http://krzyzanowski.org/rutgers/notes/content/06-clocks.pdf>.

Ringwald, Matthias and Kay Romer. "Practical Time Synchronization for Bluetooth Scatternets." In Proceedings of the Fourth International Conference on Broadband Communications, Networks and Systems (BROADNETS '07). Sep. 10-14, 2007, 11 pages, Raleigh, North Carolina, USA.

Romer, Kay, Philipp Blum and Lennart Meier. Time Synchronization and Calibration in Wireless Sensor Networks. Handbook of Sensor Networks : Algorithms and Architectures (I. Stojmenovic, ed.), Oct. 2005, 39 pages. Wiley and Sons: New York, NY, USA.

Sommer, Philipp and Roger Wattenhofer. "Symmetric Clock Synchronization in Sensor Networks." In Proceedings of the 2008 Workshop on Real World Wireless Sensor Networks, Apr. 1, 2008, 5 pages, Glasgow, Scotland.

Offset

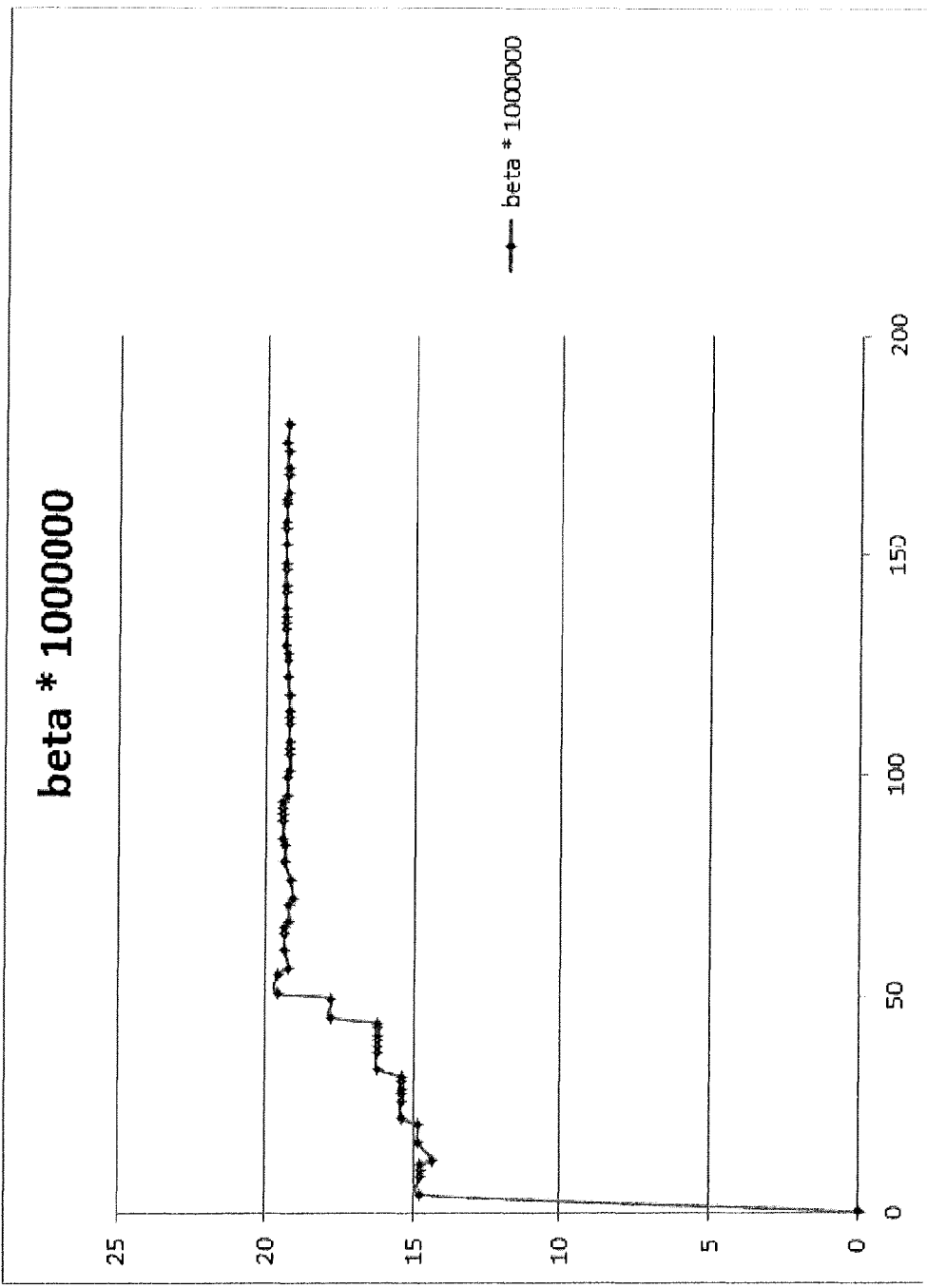

US 8,539,108 B2

DISTRIBUTED ROBUST CLOCK SYNCHRONIZATION

CLAIM OF PRIORITY

This application is a continuation application of U.S. patent application Ser. No. 12/971,903, entitled "DISTRIBUTED ROBUST CLOCK SYNCHRONIZATION," filed Dec. 17, 2010, now U.S. Pat. No. 8,316,155, which is incorporated herein by reference in its entirety.

BACKGROUND

In a networked computing environment, applications often wish to share information. Attempting to share data between different devices presents challenges. One challenge is that if there is a time component to the data, then data from at different devices may have different time references. Thus, when a device utilizes data from another device, it may not know how to relate that data to its own time clock.

SUMMARY

Technology is provided for providing a common time reference between networked devices. One or more of the devices may include one or more applications needing access to data and a common time reference between devices communicating on a network. The technology includes sending a plurality of time-stamped samples between the first device and the second device and calculating a timing reference offset between the devices for each sample. The samples are filtered to reduce the number of spurious or incorrect samples. When a defined number of samples have been acquired, a linear regression of the group offset values of the filtered samples is used to determine a predicted drift of the offset. When an application needing access to a common time reference requests a common time reference at a future time between the first device and the second device, the offset at the future time is calculated and returned to the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is a plot of the linear regression of the filtered samples of FIG. 6A.

DETAILED DESCRIPTION

The present technology provides a common timing reference between two or more networked processing devices. One or more of the devices may include one or more applications needed access to data and a common time reference between devices. In one embodiment, the devices have applications utilizing data shared in a network environment with other devices, as well as having a reference to a local clock signal on each device. A device may have a layer of code between the operating system and software applications that processes the data and maintains a remote clock reference for one or more of the other devices on the network.

Grouped and time-separated samples are exchanged between a first device and a second device and used to calculate a timing reference offset between the devices for each sample. The samples are filtered to reduce the number of spurious or incorrect samples. A linear regression of the group offset values provided by the filtered samples is used to determine a predicted drift of the offset. When an application needing access to a common time reference requests a common time reference at a future time between the first device and the second device, the offset at the future time is calculated and returned to the application.

The technology finds a number of uses in various types of networked computing environments. In one example, the technology can be utilized in a system such as that described in co-pending U.S. patent application Ser. No. (MSFT-01441US0). In this example, one device might collect sensor data from one or more cameras. This device might form a "skeletal signal" from this sensor data. For example, the skeletal signal might describe the motion of a user in terms of a skeletal model. This skeletal signal may include data samples for different points in time, and may be referred to herein as a type of "continuous signal." The device might also collect user input from a remote control, game control, etc. The device might form a "state" signal, based on this input. For example, the state signal might describe the various commands that the user inputs with the control. This type of signal may be referred to herein as a "state signal," as it may contain state information. Other types of sensor signals may also be transferred.

Figure 1:
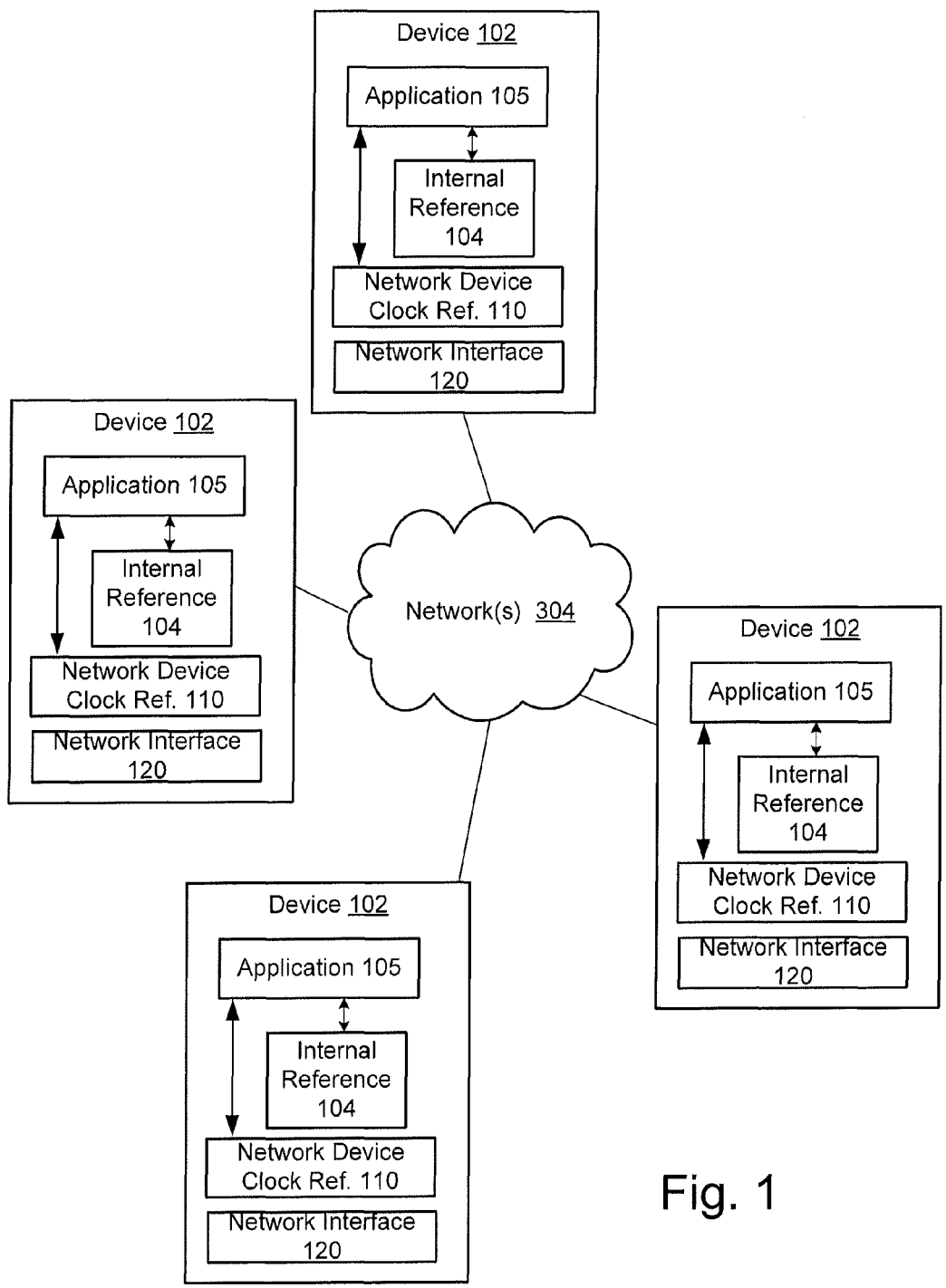
FIG. 1 depicts a networked computing environment in which the present technology may be utilized.

FIG. 1 is an example system in which embodiments may be practiced. Several devices 102 are connected by one or more networks 304. The one or more networks 304 may include a local area network (LAN). In one embodiment, the one or more networks 304 include a wide area network (WAN). For purposes of this disclosure, the Internet may be considered to be a WAN. Thus, two or more of the devices 102 may be in the same location, such as someone's home. However, at least one of the devices 102 could be remote. For example, one device 102 might be in one user's home and another device 102 in another user's home. In one embodiment, at least some of the devices 102 operate as a peer-to-peer network. For example, a group of the devices 102 may be considered equal. Further, there might not be a master/slave relationship among device 102. However, having a master/slave relationship among device 102 is one option.

The devices 102 may be different types of electronic devices. For example, the devices 102 may include, but are not limited to, a cellular telephone, a personal computer, a gaming system, or a notepad computer. At least some of the devices 102 might run different operating systems from other devices 102.

One or more of the devices 102 provides information with a local time reference which is available to the other devices 102. Each device 102 may include an application 105 which interacts with an internal time reference 104, local to the device 102. A network interface 120 allows each device 102 to communicate with other devices 102 and provides basic request and response communication between the devices over network 304. A network device clock reference 110 interacts with the network interface to determine differences between the local internal reference of a device and the internal clocks of other devices coupled to network 304.

In data transmission between devices, there may be some delay before a receiving device is able to receive and process the input from the transmitting device. Therefore, if the data is representing some real-time event at one device 102, then the receiving device 102 may obtain it after some delay. When a device 102 provides a sensor signal, it may also provide timing information with that data. In one embodiment, the subscribing device 302 is able to synchronize the data in the sensor signal with its local clock.

There may be changes to that network latency over time. Therefore, just using the sensor signal as it arrives may not result in correct behavior. Moreover, it may not be sufficient to simply rely on a time stamp in the sensor signal, as there may be some significant delay between when the sensor data was collected at the publishing device and received (or utilized) by the subscribing device. Because there may be some delay, received data may have timing information that may be somewhat behind the time at the local device.

Figure 2:
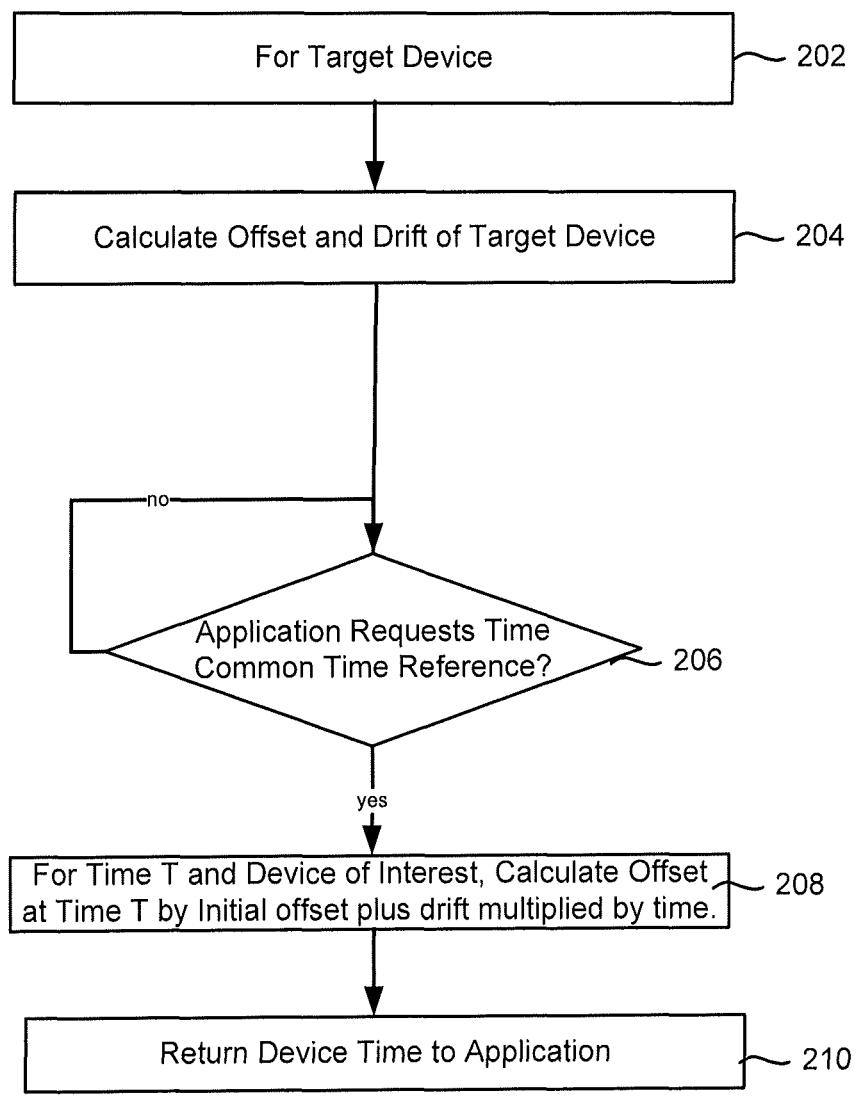
FIG. 2 is a flowchart depicting a method for performing the present technology.

FIG. 2 illustrates a method in accordance with the present technology. In one embodiment the present technology, each individual device 102 determines the time reference offset between itself and another, target, device on the network. Each individual device also determines the offset drift, which comprises the change of the offset with respect to time. Using this information, each local device can calculate the difference in time references between itself and other devices on a network, and use this information to provide a common time reference to, for example, local applications utilizing data from other devices.

At 202, the method of FIG. 2 may be performed for each target device on the network. The method may be performed for a subset of all devices on the network, and for one or more target devices.

At 204, the timing offset between the local device and the target device, and the drift of the timing offset, is calculated. A method for calculating the offset and drift in accordance with the present technology is described with respect to FIG. 4.

At 206, when an application requests a common time reference for a given time T and a specific target device, a common time reference is provided at 208 by calculating the offset as a function of the known drift at time T. For a time T and a device of interest, the offset relative to another device is offset(T)=initial offset+drift*time. The target device time is returned to the application at 210.

In accordance with the technology, no actual change to any of the local time references is required. In one embodiment, calculations are provided by the network time interface 110, which outputs samples, collects sample data, performs filtering and maintains information on any one or more of the other devices coupled to the network. Time interface 110 may alternatively correct time-stamp information in incoming data or provide the correction to the application in order to allow the application to perform any necessary correction on its own. In this manner, no one device is required to comprise a master or slave device, and all internal time references are allowed to run independently.

Figure 3:
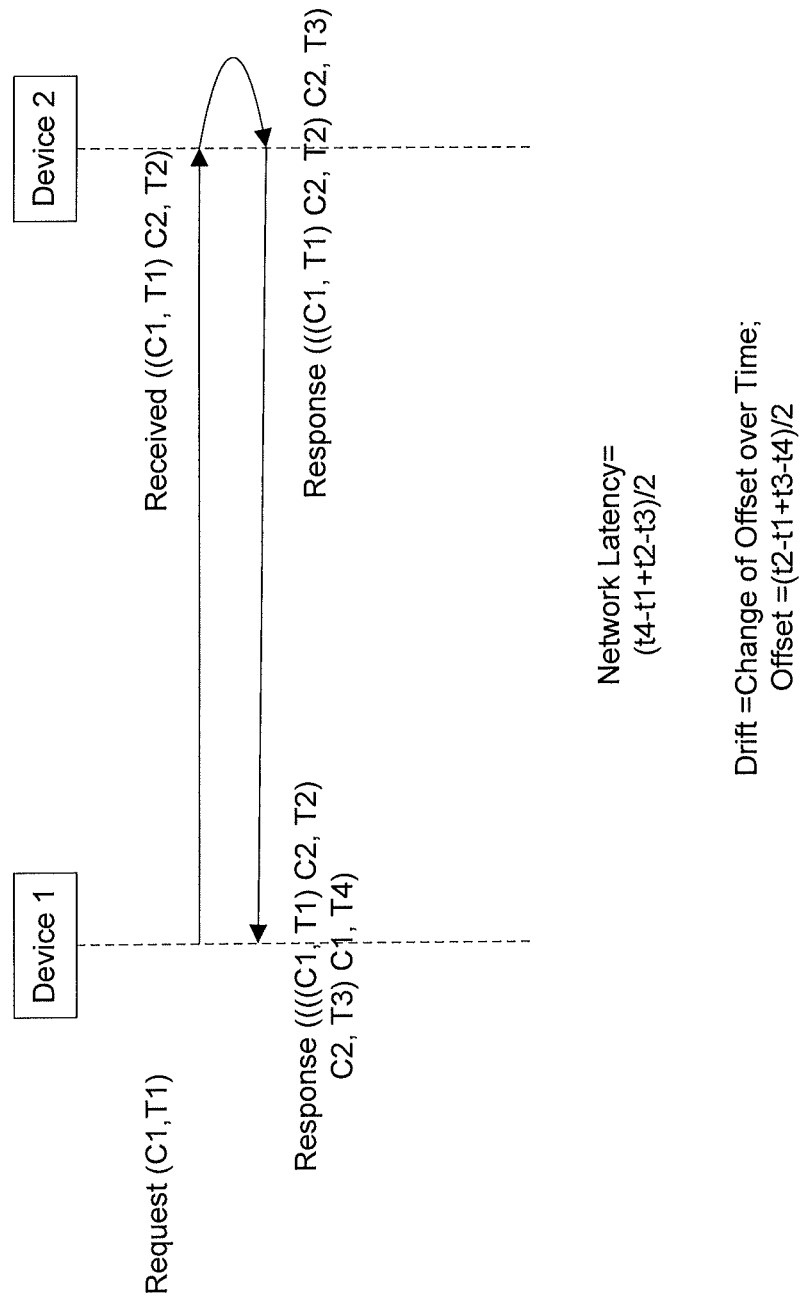
FIG. 3 illustrates one sample utilized in the method of the present technology.

FIG. 3 illustrates a single sample exchange between two devices. As illustrated in FIG. 3, in order to calculate the offset between two respective devices, for example device 1 and device 2, a response/reply protocol is utilized. The response/acknowledge protocol consists of several packet exchanges where each exchange is a pair of request and reply. On return to the originating device (Device 1), four timestamps are present in the packet. When sending out a request, the local device stores its own time (originating timestamp (C1, T1)) into the packet being sent. When a target device receives such a packet, it will in turn store its own time (receive timestamp (C2, T2)) into the packet, and the packet will be returned after putting a transmit timestamp (C2, T3) into the packet. When receiving the reply, the receiver will once more log its own receipt time (C1, T4) to estimate the travelling time of the packet. The travelling time (delay) is estimated to be half of the total delay minus remote processing time, assuming symmetrical delays. The time differences can be used to calculate the time offset between both machines.

Figure 4:
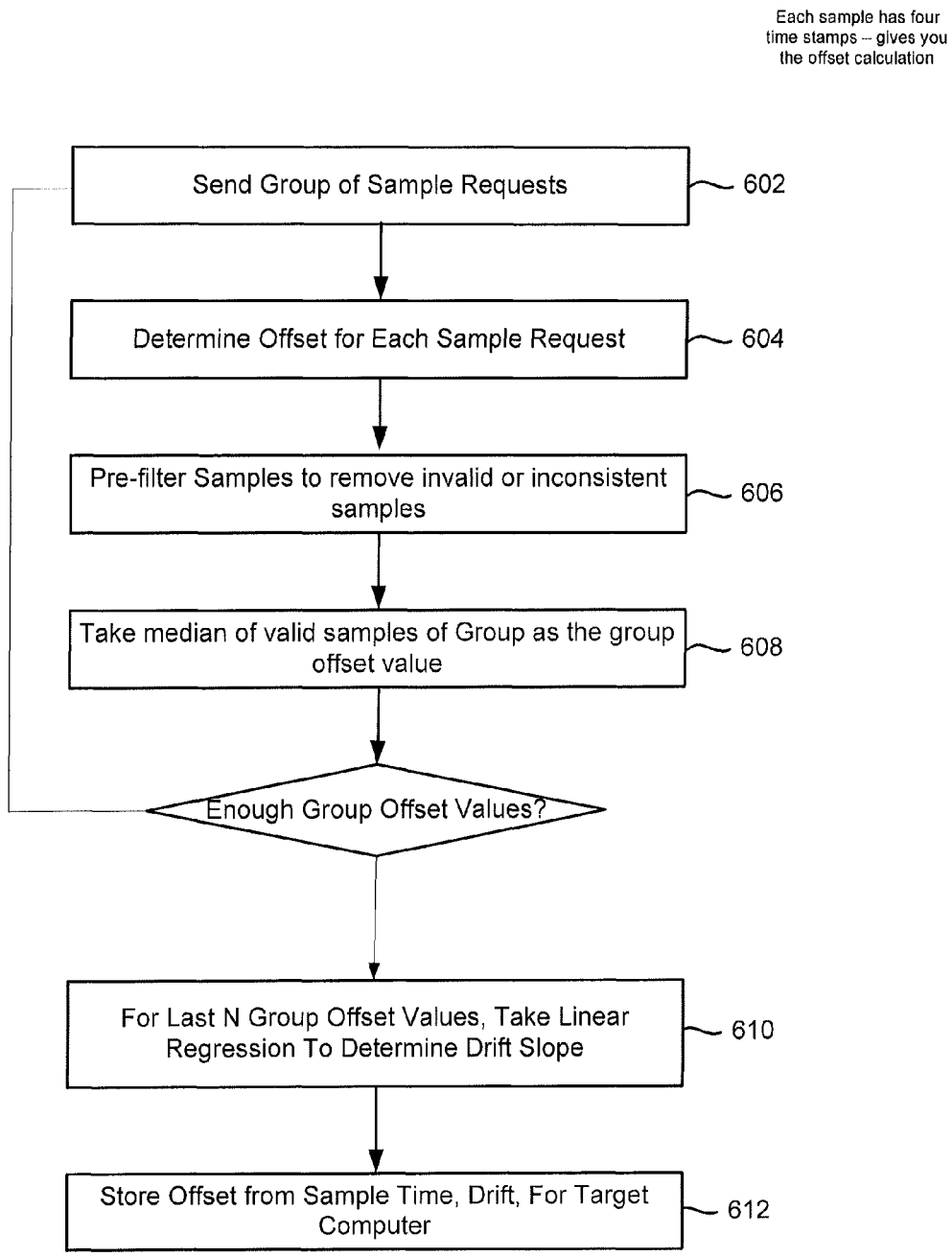
FIG. 4 is a flowchart illustrating a method of calculating the offset and drift of FIG. 2.

FIG. 4 illustrates a method for calculating the drift and offset in accordance with step 204 of FIG. 2. At 402, sample requests are forwarded to a target device. In one embodiment, sample requests may be continuously sent to the target server. In another embodiment, sample requests are grouped in number and time. For example, 5 or 10 requests may be sent sequentially in a group, followed by a second group of requests spaced apart from the first group by some period of time. Grouping of the requests in this manner reduces the bandwidth used by the method on the network.

For each request in the sample, the network offset is determined at 404. Where the sending computer originating timestamp is T1, the receiving computer receive timestamp is T2, the receiving computer transmit timestamp is T3 and the originating computer receiving time is T4, the offset is defined as The round-trip delay (network latency) is defined as $=(T4-T1)-(T2-T3)$ and local clock offset relative to the remote clock is defined as $=((T2-T1)+(T3-T4))/2$.

Figure 5A:
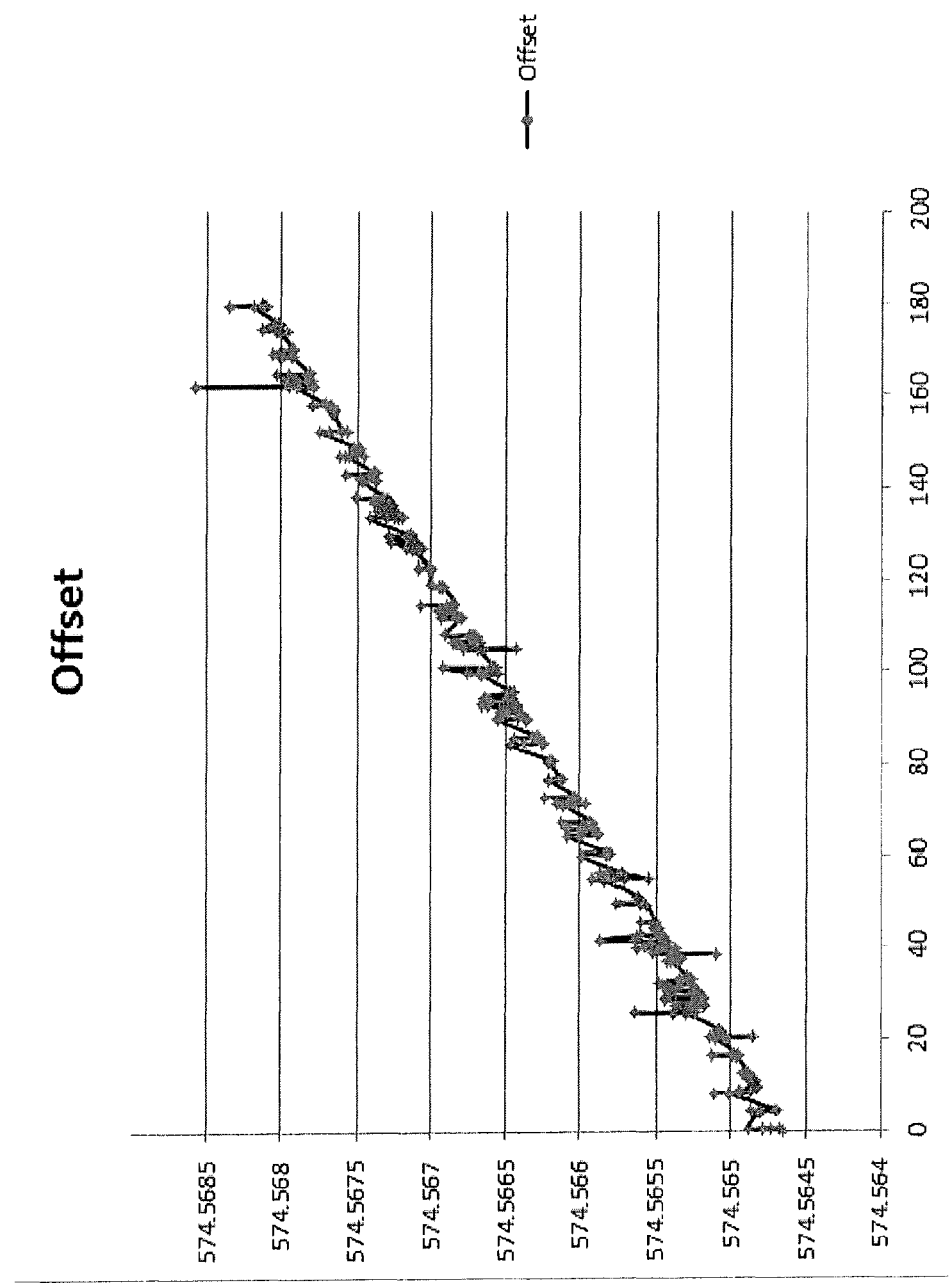
FIG. 5A is a plot of a number of samples versus the calculated offset for each sample.
Figure 5B:
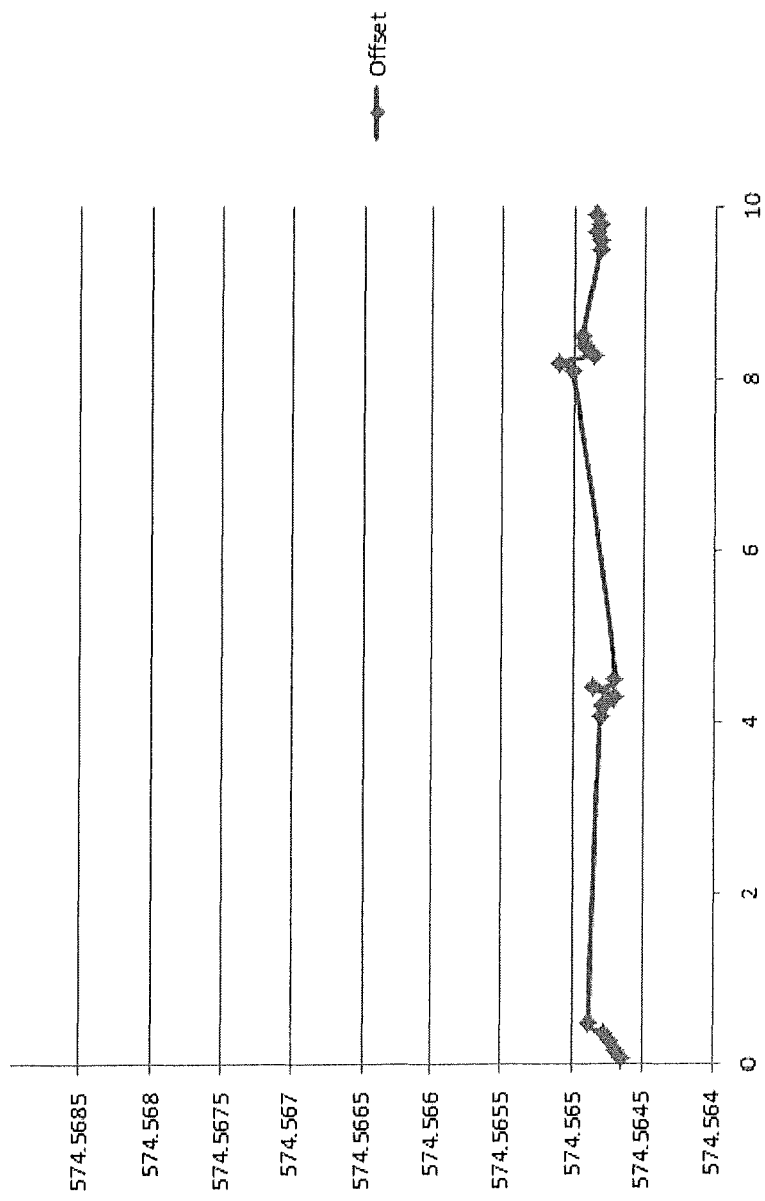
FIG. 5B is an expanded view of the first ten samples of the plot of FIG. 5A.

A graph of a continuously sampled target device offset relative to a local device is illustrated in FIG. 5A. In FIGS. 5A and 5B, the y axis illustrates the number of seconds and the x-axis is the number of the sample. FIG. 5B is an illustration of the calculated offset for a group of 10 samples.

At 406, where samples are provided in a group, a pre-filter is used on each sample in the group to eliminate samples having a value outside the range of a defined norm. Any negative value latency or offset samples are eliminated, as well as any samples having an offset over a defined threshold. The threshold can be set as a function of the speed of the network and previously derived samples.

Figure 6A:
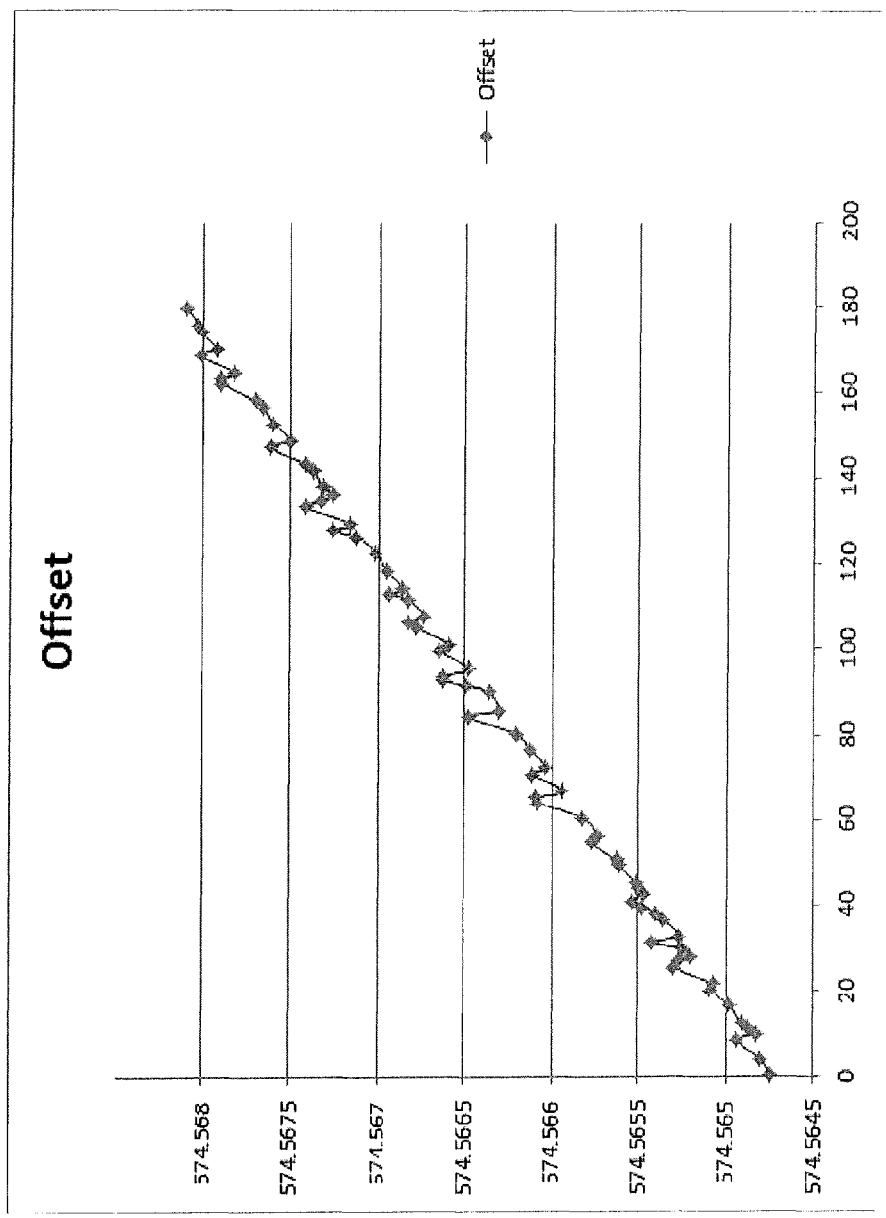
FIG. 6A is a plot of a filtered number of samples versus the calculated offset for each sample.
Figure 6B:
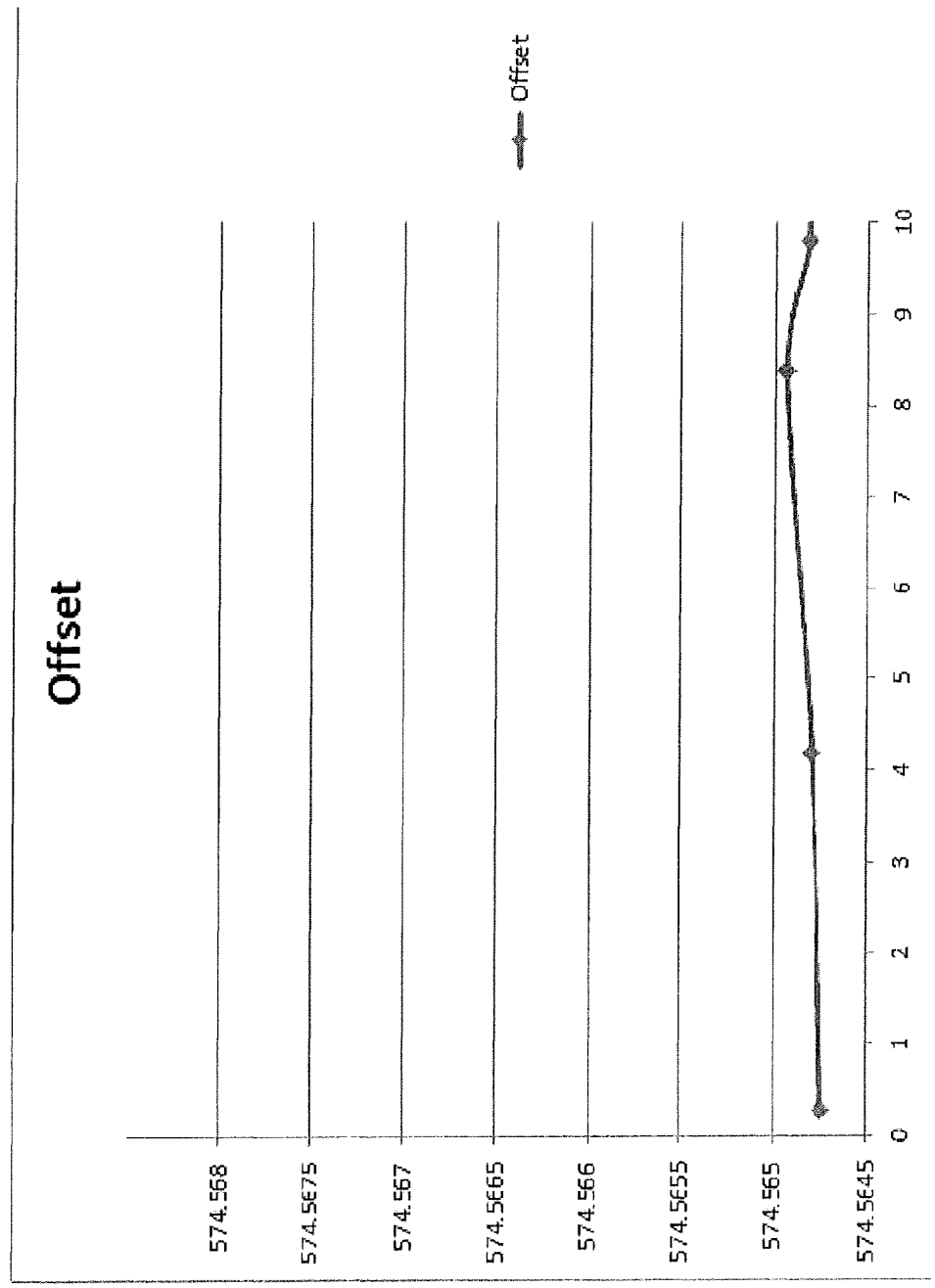
FIG. 6B is an expanded view of the filtered first ten samples of the plot of FIG. 6B.

A graph of a continuously sampled and pre-filtered target server offset relative to a local device is illustrated in FIG. 6A. FIG. 6B is an illustration of the group of 10 samples shown in FIG. 5B after pre-filtering. As shown the pre-filtering leaves approximately 4 remaining group leads.

At 408, a median sample for each group of samples is determined and designated a group offset value. In one embodiment, the group offset value are used to calculate the overall offset and drift for the local and target devices.

At 410, a determination is made as to whether enough samples (or group offset values) have been acquired to provide a statistically valid offset and drift of the two devices. If not, addition samples or group offset values are acquired at 402-408.

If so, at 410, using N samples, a linear regression is taken to determine the slope of the drift, allowing prediction of the offset at any future point in time relative to the known offset at a given time plus the drift.

A graph of the linear regression of the filtered samples shown in FIG. 6 is illustrated in FIG. 7. FIG. 7 illustrates that after an initial sampling period of approximately 60 samples, the slope of the drift stabilizes at zero, and the drift (in milliseconds, illustrated as the y-axis in FIG. 7) stabilizes at about 19.

The offset from known times as well as the computed drift are stored at 412 for use by the local system relative to the target computer as needed, for example, by an application 105.

Figure 8:
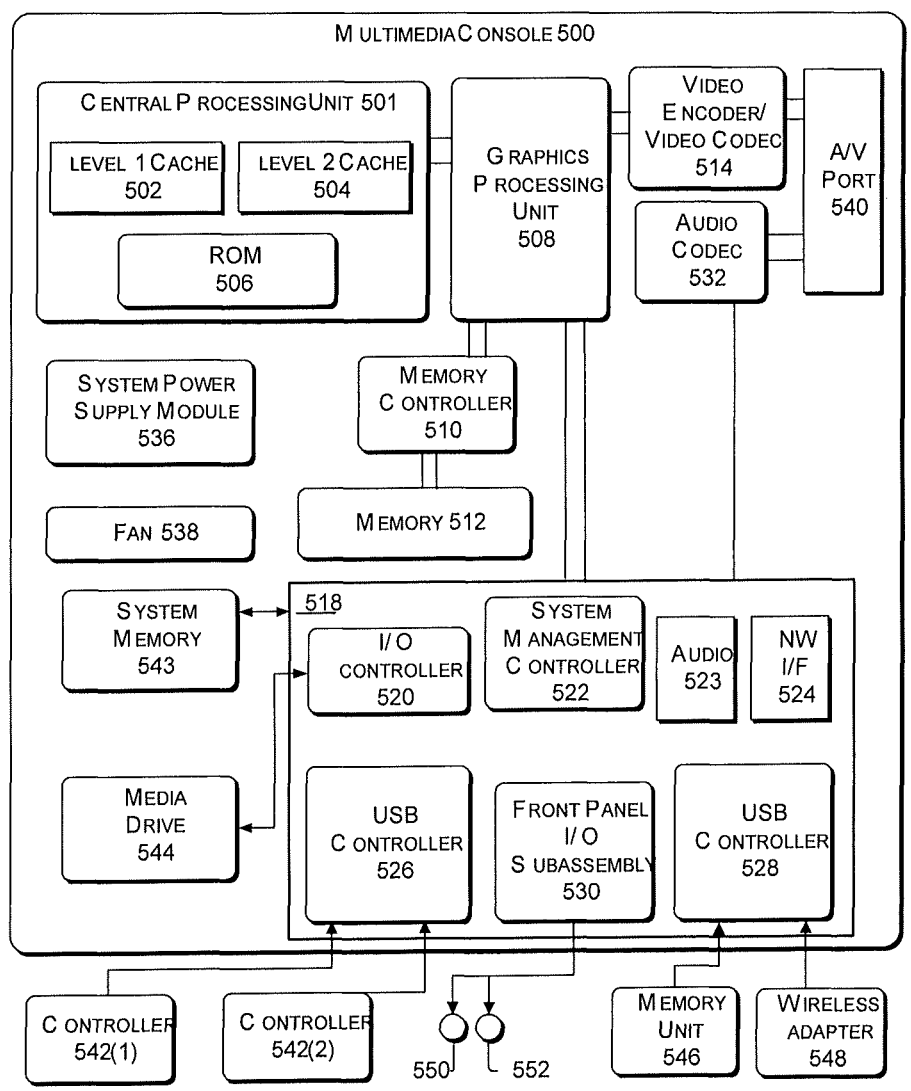
FIG. 8 is a processing device suitable for use with the present technology.

FIG. 8 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. No one hardware architecture is required.

Figure 9:
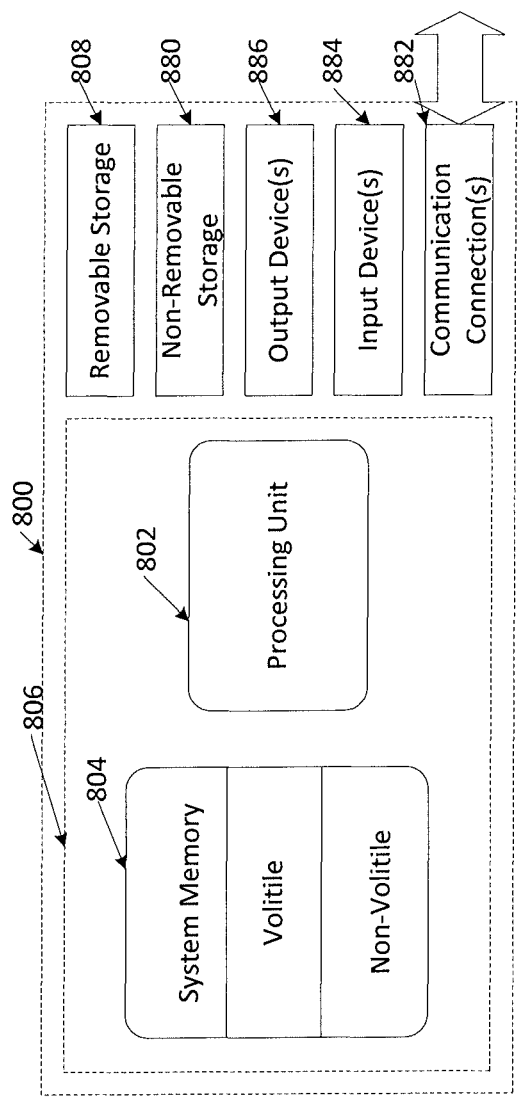
FIG. 9 is a depiction of anther processing device suitable for use with the present technology.

The technology may be utilized with a general purpose computing system illustrated in FIG. 9.

With reference to FIG. 9, an exemplary system for implementing the technology includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 8 by removable storage 808 and non-removable storage 880. Computer storage media includes volatile and nonvolatile, removable and non-removable media implemented in any method or technology for storage of information such as computer readable instructions, data structures, program modules or other data. Memory 804, removable storage 808 and non-removable storage 880 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Device 800 may also contain communications connection(s) 882 that allow the device to communicate with other devices. Communications connection(s) 882 is an example of communication media. Communication media typically embodies computer readable instructions, data structures, program modules or other data. By way of example, and not limitation, communication media includes wired media such as a wired network or direct-wired connection, and wireless media such as acoustic, RF, infrared and other wireless media.

Device 800 may also have input device(s) 884 such as keyboard, mouse, pen, voice input device, touch input device, etc. Output device(s) 886 such as a display, speakers, printer, etc. may also be included. All these devices are well know in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method providing a common time reference for at least a first and a second processing device coupled by a network, comprising:
    sending a plurality of time-stamped samples between the first processing device and the second processing device;
    calculating a timing reference offset between the devices for each sample;
    calculating a predicted drift of the offset after acquiring a defined number of samples; and
    responsive to a request for a common time reference at a future time between the first processing device and the second processing device, calculating the offset at the future time from the predicted drift.

2. The method of claim 1 further including the step of filtering the samples to define one or more filtered samples each providing an offset and the defined number of samples includes a defined number of filtered samples.

3. The method of claim 2 wherein the step of calculating comprises performing a regression analysis of the offsets of the filtered samples to determine a predicted drift of the offset.

4. The method of claim 2 wherein said filtering comprises discarding samples over a threshold duration and discarding negative samples.

5. The method of claim 1 further including the steps of grouping the samples, temporally separating groups of samples, determining a group offset value for a group of samples, and wherein the step of calculating performing a regression analysis of a group value.

6. The method of claim 5 further including the step of taking a median sample of each group of samples to define a lead sample.

7. The method of claim 1 further including providing common time reference for at least the first processing device and a third processing device by repeating said sending, calculating, filtering, taking and calculating steps relative to said first processing device and the third processing device.

8. The method of claim 1 wherein each said sample comprises a request from the first processing device to the second processing device, and a reply from the second processing device to the first processing device, including four time stamps used to calculate the timing offset between the devices.

9. A computer readable device including code for instructing a processor to provide a common time reference between a local device and a target device coupled by a network, comprising:
    initiating a plurality of groups of samples testing a timing reference offset between a local device and a target device;
    calculating the offset for each sample;

for each group, filtering the samples to define one or more group offset values for the group;

when a defined number of samples have been acquired, calculating a predicted drift of the offset; and responsive to a request for a common time reference at a future time between the local device and the target device, calculating the offset at the future time.

10. The computer readable device of claim 9 wherein each said sample comprises a request from the local device to the target device, and a reply from the target device to the local device, including four time stamps used to calculate the timing offset between the devices.

11. The computer readable device of claim 10 further including establishing common time reference for at least the local device and a third device by repeating said initiating, calculating, filtering, taking and calculating steps relative to said local device and the third device.

12. The computer readable device of claim 9 further including temporally separating each of the plurality of groups of samples, determining a group offset value for a group of samples, and wherein the step of performing a regression analysis includes taking a linear regression of a group value.

13. The computer readable device of claim 9 further including the step of taking a median sample of the group of samples to define a lead sample.

14. A processing device coupled to a network, the processing device including code instructing a processor to provide a common reference between the processing device and another processing device coupled to a network, comprising:

sending a plurality of temporally separated groups of samples to determine a timing reference offset between a local device and a target device;

calculating a timing reference offset for each sample;

for each group, filtering the samples to define one or more group offset values of the group;

when a defined number of samples have been acquired, calculating a predicted drift of the offset; and responsive to a request for a common time reference at a future time between the local device and the target device, calculating the offset at the future time.

15. The processing device of claim 14 wherein each said sample comprises a request from the local device to the target device, and a reply from the target device to the local device, including four time stamps used to calculate the timing offset between the devices.

16. The processing device of claim 15 further including the step of taking a median sample of the group of samples to define a lead sample.

17. The processing device of claim 14 further including further including temporally separating each of the plurality of groups of samples, determining a group offset value for a group of samples, and wherein the step of performing a regression analysis includes taking a linear regression of a group value.

18. The processing device of claim 17 further including establishing common time reference for at least the local device and a second target device by repeating said determining, calculating, filtering, taking and calculating steps relative to said local device and the second target device.

19. The processing device of claim 18 wherein said filtering comprises discarding samples over a threshold duration and discarding negative samples.

20. The processing device of claim 19 wherein the step of calculating comprises taking a linear regression of the one or more group offset values to determine a predicted drift of the offset.

* * * * *